Nov. 18, 1969 R. M. DEARY 3,478,495

AIR POLLUTION FILTER APPARATUS

Filed Jan. 23, 1968

INVENTOR.
REYNALDO M. DEARY
BY
ATTORNEY

United States Patent Office 3,478,495
Patented Nov. 18, 1969

3,478,495
AIR POLLUTION FILTER APPARATUS
Reynaldo M. Deary, 2206 N. Poinsettia Ave.,
Santa Ana, Calif. 92706
Filed Jan. 23, 1968, Ser. No. 699,961
Int. Cl. B01d 47/00
U.S. Cl. 55—227        6 Claims

ABSTRACT OF THE DISCLOSURE

Apparatus for removing pollutants from air by contacting pollutant laden air with water so that some of the water is vaporized and contains pollutants which are dissolved or suspended in such vapor and so that other pollutants which are trapped by water and which collect or float on its surface are carried away and discharged as liquids and solids. The embodiment of the invention selected for illustration in the drawing is suitable for mounting upon a motor vehicle having an internal combustion engine. It comprises a structure to which water and polluted air are delivered and where the air and water come into contact. Two containers are provided. One is a source of water supplied to the water-air contacting means and the other is a source container for water which has been delivered to the water-air contacting means and was not there vaporized. The two containers are connected by a passageway and valve system which permits recirculation of the water without recirculating those pollutants which are solid or are reduced to liquid form by contact with water and which float upon it.

---

This invention relates to improvements in apparatus for removing pollution from air and it relates particularly to a filter for removing from air those pollutants which are characteristic of automobile exhaust products and are often called "smog."

Applicant has discovered that many air pollutants will dissolve or will be held in suspension in water and water vapor and that other pollutants are attracted to and will adhere to the surface of a body of water. An object of the invention is to provide an improved apparatus for removing such pollutants from the atmosphere. Smog has proven to be a particularly troublesome and harmful form of pollutant. While its composition varies, it generally comprises unoxidized or only partially oxidized components of gasoline and oil. Thus, it comprises carbon, carbon dioxide, sulfur dioxide, nitrous oxide and other pollutants which are expelled from automobile exhaust systems.

An object of the invention is to provide a smog filter which will remove substantial quantities of these pollutants from air to which automobile engines have been exhausted or from the exhaust of automobiles with which the apparatus may be associated.

Another object of the present invention is to provide a smog filter employing a minimum number of movable parts and which is inexpensive to manufacture and to operate. Another object of the invention is to provide an apparatus which utilizes water to entrap air pollutants and to discharge water vapor to the atmosphere.

Concentrations of polluted air can be prevented by preventing discharge of pollutants to the air, by removing pollutants from polluted air, and by dispersing polluted air so that it can be replaced by fresh air. Dispersion is made difficult by geographical factors which characterize certain parts of the country. Thus, in the Los Angeles, California basin the dispersion of smog, smoke and otherwise polluted air is impeded by mountains which extend around the basin on its leeward side and by the propensity of warm air masses to form above the basin whereby the surface air is prevented from rising. This latter condition is overcome and surface is permitted to rise if the surface air is sufficiently humid. Thus, if the smog and polluted air can be made more humid by the addition of substantial quantities thereto of water vapor, much of the polluted air will ries and be dispelled away from the basin.

An object of the invention is to provide an improved smog filtering mechanism which entraps many pollutants including some of the major constituents of smog, and which dispells water vapor to the atmosphere. Cars in many localities, including California, are required to be provided with apparatus which will entrap smog. If in addition such apparatus is made to expel water vapor, their combined effect would add materially to the humidity of those areas in which motor vehicles and smog are concentrated. Because smog originates on the roadways, a smog filter carried upon an automobile can aid materially in reducing smog concentrations not only by filtering the exhaust products of the automobile by which it is carried but it can aid materially by being made to filter the air which surrounds the automobile and which contains exhaust products of other automobiles. Accordingly, it is an object of the invention to provide an improved air pollutant removal device or filter capable of filtering the exhaust products of an automobile by which the filter is carried, or by treating air surrounding such an automobile or by adding water vapor to the atmosphere or by a combination of these effects. Because it need not be mounted upon the vehicle whose exhaust products are to be removed from the air, the invention is useful for treating air and removing pollutants in those cases where it is not practical to mount the filter apparatus upon the vehicle or other source of pollutant material. Thus, for example, a filter embodying the invention may be placed along side airport runways in the region from which aircraft take off and where large quantities of smog are generated.

These and other objects and advantages of the invention are realized in part by the provision of apparatus comprising a water vaporizer including surfaces over which water may flow while being contacted by polluted air and means for continuously flowing water over said surfaces and means for directing quantities of pollutant laden air to the water flowing over said surfaces.

While the invention is not limited to use in motor vehicles having internal combustion engines, it is especially suited for that application. Accordingly, the embodiment of the invention selected for illustration in the drawings and the description in the specification is one which is suitable for association with such a motor vehicle.

Figure 1:
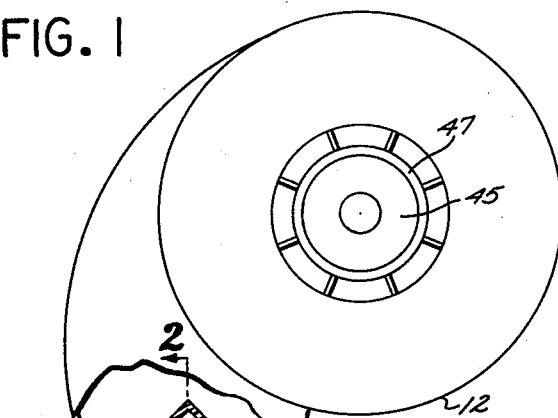
FIGURE 1 is a schematic representation of apparatus for removing pollution from air embodying the invention and comprising a blower, a water vaporizer, and first and second water containers together with valving and conduits by which water is circulated from one container to the other and to the water vaporizer.

Referring to FIGURE 1 of the drawings, there is shown a vaporizer generally designated by the numberal 10, and a blower 12 having an outlet or discharge conduit 13 by which air is directed against the outer surface of the water vaporizer and through that surface to the atmosphere. The apparatus also includes two water containers the first of which is designated by the numeral 15 and is the source of water for the vaporizer 10. A conduit 17 delivers water from the container 15 to the vaporizer. That portion of the water which is not vaporized and which collects in a collection trough of the vaporizer is returned by a conduit 19 to the second container generally designated 21. In the embodiment selected for illustration containers 15 and 21 are formed by a single housing 23 having an internal divider 25 which separates the vessel 23 into the first and second containers and which serves as the botom wall of the second container 21.

Figure 2:
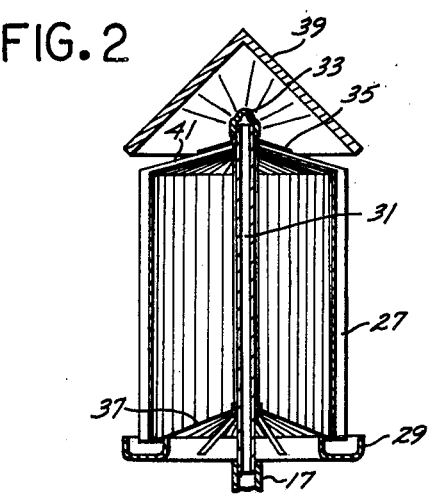
FIGURE 2 is a cross-sectional view of the water vaporizer, taken on line 2—2 of FIGURE 1.

The water vaporizer 10 comprises a generally cylindrical, outer, water-air contacting surface 27 which terminates at its lower end in a water collection trough 29 which may be seen in cross-section in FIGURE 2. It comprises an annular ring, U-shaped in cross-section, and of diameter to underlie the lower margin of the generally cylindrical side wall 27 of the vaporizer. Conduit 17 connects at its end to a pipe 31 which extends upwardly through the cylindrical wall 27 of the unit along its axis to a point above the upper margin of the side wall 27. Just below its upper end the pipe 31 is provided with a generally laterally extending skirt or flange 35 which is mounted upon, and is fixed to, the pipe. The material of which the side walls 27 are formed is turned inwardly to form an upper end cover 41 for the cylindrical side wall structure. This end cover or wall is secured by any convenient means, not shown, to the underside of the skirt 35. A spray head 33 is attached to the central water feed pipe 31 at its upper end above the flange 35. The feed pipe 31 has a rigid connection to the lower margin of side wall 27 and to the collection trough 29 by a spider structure which includes a central hub surrounding the feed pipe 31. The structure also comprises a plurality of blades, L-shaped in cross-section, which extend radially in all directions from the hub to points of interconnection adjacent to trough 29 to form a fan rotatable about the feed pipe 31. A conical shield and spray deflector 39 is mounted, by a means not shown, with its axis coincident with the axis of the feed pipe 31 and cylindrical side walls 27 of the vaporizer. Thus, the apex of the deflector shield lies directly above the spray head and the sides of the shield extend downwardly and outwardly to a lower circumferential edge which terminates slightly above the upper end of side wall 27. It also extends beyond or outwardly of the wall 27 because it has slightly larger diameter than the wall 27.

Water forced up through the feed pipe 31 emerges from the spray head in all radial directions against the underside of the conical shield 39 from which it rebounds to fall upon the upper end wall 41 of the generally cylindrical water-air contacting surface of the unit. The end wall slopes outwardly and downwardly so the water falling on the end wall 41 flows outwardly and downwardly to the upper end of the cylindrical side all 27 and thereafter flows downwardly along the surface of the wall 27. Advantageously the spray head and deflecting shield are adjusted so that water flows downwardly in equal volume on all sides of the wall 27.

Figure 4:
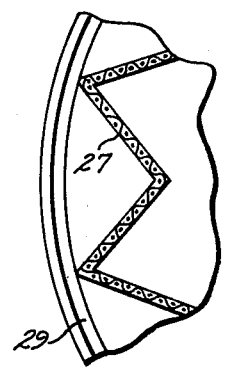
FIGURE 4 is a cross-sectional view of a fragment of an alternative water vaporizer wall construction.
Figure 4:
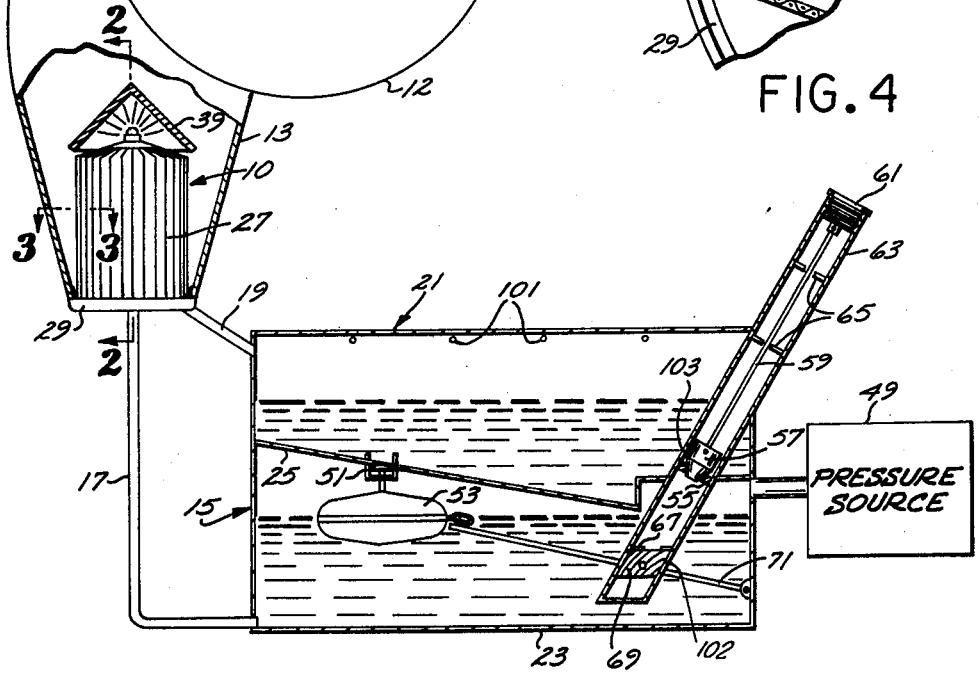
Figure 3:
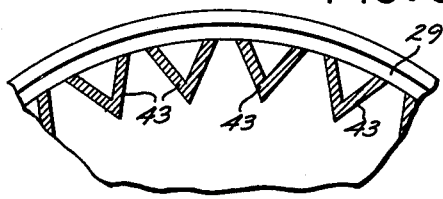
FIGURE 3 is a cross-sectional view of a fragment of the water vaporizer, taken on line 3—3 of FIGURE 1.

The water vaporizer need not and does not vaporize all of the water that is delivered to it. Some air pollutants will combine with air and water to form water vapor of which the pollutant is a constituent. In this form pollutants are dispelled more quickly, under most atmospheric and climatic conditions, than when they occur in a simple gas mixture with air. Other air pollutants do not become constituents of water vapor but are wetted and entrapped by water or are cooled and liquefied by water and are carried away with the unvaporized water that flows into the collection trough 29 and thence through conduit 19 to the second container 21. Advantageously then, the water vaporizer is arranged to effect maximum contact of water and polluted air, one with the other. To this end, means are provided in the water vaporizer for causing water to flow over a surface such that shear forces acting upon the flowing water result in continual change, within each volume or segment of the water stream, of that water which comprises the outer film adjacent the polluted air. This can be accomplished by constructing wall 27 of a substance which is wetted by water whereby in a layer of water flowing over the surface, the inner side of the layer is slowed in its downward movement by adherence to the wall while the outer side of the layer is stripped away to move downward more rapidly whereby to insure continual exposure of fresh water to the surrounding polluted air. Advantageously, the cylindrical wall 27 is arranged so that it divides the stream of water flowing downwardly over it into a plurality of parallel downwardly flowing streams between which polluted air is free to flow. This can be accomplished as shown in FIGURE 3 by forming the cylindrical wall 27 from a plurality of parallel, vertically extending, V-shaped water guides 43. This construction is employed in the structure of FIGURES 1 and 2. An alternative structure is shown in FIGURE 4. In this structure the cylindrical side walls 27 are formed of a screen material folded on vertically extending lines to form a series of shallow, V-shaped, parallel identations around the entire periphery of the wall 27. Advantageously, as shown, the screening is oriented so that one set of the parallel screening threads or wires is arranged vertically whereby to form vertical surfaces down which water may flow and between which polluted air may flow.

The blower 12 has any convenient form which is effective to force large quantities of air through the water vaporizer 10. The blower 12 is provided with an air inlet 45 arranged to receive polluted air such, for example, as substantially all of the exhaust products of a vehicle upon which the apparatus may be mounted. The blower further comprises a rotatable squirrel cage 47 by which air is forced downwardly through an outlet conduit or chute 13 which surrounds the water vaporizer 10. The vaporizer axis is substantially coincident with the axis of the outlet conduit 13 and the conduit terminates at its lower edge upon the outer rim of the water collection trough 29. This construction is effective to deliver air from the blower 12 uniformly to all sides of the vaporizer 10. Any water which may drip from the outer margins of the shield deflector 39 will be blown against the outer wall 27 of the vaporizer. The polluted air flows through the wall 27 and emerges from the bottom of the vaporizer to the surrounding atmosphere.

In operation of the device thus far described, a supply of water resident in the first container 15 is forced by pressure applied to said first container from a source of pressure 49 through supply conduit 17 up into the inlet pipe 31. Upon reaching spray head 33 the water is sprayed in all directions to the underside of the deflector shield 39. This shield protects the spray from deflection by inlet air forced down upon the vaporizer by blower 12 and it deflects the water downwardly and uniformly over the upper end 41 of the water-air contact structure. The water then flows uniformly down over the sides 27 of the vaporizer and some of it is vaporized by air from blower 12 flowing through the wall 27 and out of the bottom of the unit past fan 37 and through the center of collector trough 29. Water that is not vaporized is collected in collection trough 29 and is lead by conduit 19 to the interior of the second container 21. Any droplets of water that are carried to the interior of the vaporizer are propelled toward trough 29 by the blades of fan 37. With continued operation the level of water in the first container is lowered whereas the level of water in the second container is increased.

Means are provided in the invention for transferring water from the second container to the first container as a function of the levels of the water in the two containers. This means includes means for insuring that exhaust products which float on top of, or settle to the bottom of, the body of water in the second container 21 are not transferred to the first container 15. Advantageously this means comprises, as in the embodiment shown, a passageway interconnecting the two containers and having the form of an opening formed in the bottom wall 25 of the second tank 21 together with a valve 51 which is maintained closed by a float 53 so long as the level of the water in container 15, where float 53 is disposed, exceeds a predetermined level or unless the level of water over the valve in the second container exceeds the level of water in the first container by some predetermined amount whereby the weight of water in the second container above valve 51 will push the valve head down to open the valve despite the valve closing force exerted by the float 53. Bottom wall 25 of the upper or second tank 21 is sloped and the opening which communicates between the two containers is formed in the bottom wall 25 at a point substantially above the lowest point of that wall. Accordingly, solid matter which collects at the bottom of the body of water in the second tank 21 collects at a point below the valve opening for subsequent removal by an opening not shown. Liquid or solid matter which floats on the upper surface of the body of water in the second container does not flow through the valve 51 when the second tank is drained into the first because the valve is located at a point above the bottom of the upper tank. Instead that floating liquid or solid matter flows out drain holes 101 when the second tank 21 becomes filled.

Means are provided for filling the two containers 15 and 21. In the embodiment selected for illustration in the drawing this means comprises a fill tube which extends from a point above the container structure 23 downwardly through the upper container 21 into the lower or first container 15. Because the lower or first container is pressurized whereas the upper or second container is not, the fill tube includes a valve to separate the two containers. This valve comprises a seat 55 secured to the inside of the fill tube. The valve head 57 is mounted upon an actuating rod 59 which is connected at its upper end to the closure cap 61 of the fill tube 63. When the fill cap 61 is removed the head 57 is withdrawn from the seat 55 and water poured into the fill tube will enter both the upper and lower containers. It enters the lower container through slots formed through the fill tube wall near its lower end, one of which slots is visible in FIGURE 1 where it is designated by the reference numeral 102, and it enters the upper container 21 through the opening 103 formed through the fill tube wall above its valve seat 55. Spiders 65, mounted on the interior wall of the fill tube, guide the rod 59 but do not impede the flow of water into the tube.

In the preferred form of the invention, an ullage space of substantial volume is reserved whereby to damp pressure variations from source 59 which might otherwise result in spurting and irregular operation of the spray head 33 as a result of pressure transients. Accordingly, in the preferred form of the invention, means are provided for sealing the lower or first container 15 against the entry through the fill tube of more than a predetermined volume of water. This means comprises a valve at the lower end of the fill tube which includes a valve seat 67 and a valve head 69 which is carried by the mounting rod 71 of the float 53. This structure is arranged so that when float 53 rises sufficiently to seal the valve 51, head 69 is also seated against its valve seat 67.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. Air pollutant dispelling apparatus comprising a water vaporizer including surfaces over which water may flow while being contacted by pollutant air; means for continuously flowing water over said surfaces; means for directing quantities of polluted air to the water flowing over said surfaces; and means for expelling vaporized water from said water vaporizer to the atmosphere in which said means for continuously flowing water over said surfaces comprises a first container and means for delivering water from said first container to said water vaporizer, a second container and means for conducting unvaporized water from said water vaporizer to said second container, and means for replenishing the supply of water in said first container from said second container while precluding transfer to said first container of material floating upon the surface of the body of water in said second container comprising a sloping bottom portion at the bottom of said second container and including a passageway connecting a point in said bottom removed from the lowest point thereof with said first container, and including a valve responsive to water levels in said two containers.

2. The invention defined in claim 1, in which said valve comprises a float valve having its float disposed in said first container and effective to close said passageway when the water in said first container has a level exceeding a predetermined level relative to the level in said second container.

3. Air pollutant dispelling apparatus comprising a water vaporizer including surfaces over which water may flow while being contacted by pollutant air; means for continuously flowing water over said surfaces; means for directing quantities of polluted air to the water flowing over said surfaces; and means for expelling vaporized water from said water vaporizer to the atmosphere in which said means for continuously flowing water over said surfaces comprises a first container and means for delivering water from said first container to said water vaporizer, a second container and means for conducting unvaporized water from said water vaporizer to said second container, and means for replenishing the supply of water in said first container from said second container while precluding transfer to said first container of material floating upon the surface of the body of water in said second container comprising a sloping bottom portion at the bottom of said second container and including a passageway connecting a point in said bottom removed from the lowest point thereof with said first container, and including a valve responsive to water levels in said two containers, and in which said valve comprises a float valve having its float disposed in said first container and effective to close said passageway when the water in said first container has a level exceeding a predetermined level.

4. Air pollutant dispelling apparatus comprising a water vaporizer including surfaces over which water may flow while being contacted by pollutant air; means for continuously flowing water over said surfaces; means for directing quantities of polluted air to the water flowing over said surfaces; and means for expelling vaporized water from said water vaporizer to the atmosphere, and in which said means for continuously flowing water over said surfaces comprises a first container and means for delivering water from said first container to said water vaporizer, a second container and means for conducting unvaporized water from said water vaporizer to said second container, and means for replenishing the supply of water in said first container from said second container while precluding transfer to said first container of material floating upon the surface of the body of water in said second container, and in which said water vaporizer comprises a plurality of elongate water flow guides arranged side by side about a central axis to define a generally cylindrical structure terminating at its lower margin in a water collection trough and means for discharging water collected in said trough to said second container, said water guides being spaced apart whereby a flow of air between adjacent guides is permitted; a central fountain disposed to deliver water to the upper ends of said flow guides; and means for shielding said fountain from air delivered to said water vaporizer by said means for directing quantities of polluted air to said water.

5. The invention defined in claim 4, including a conduit for delivering water from said first container to said fountain and including means for pressurizing said first container sufficiently to force water from said first container to said fountain.

6. Air pollutant dispelling apparatus comprising a water vaporizer including surfaces over which water may flow while being contacted by polluted air; means for continuously flowing water over said surfaces; means for directing quantities of polluted air to the water flowing over said surfaces; and means for expelling vaporized water from said vaporizer to the atmosphere, and in which said means for directing quantities of polluted air to said vaporizer comprises a blower; and in which said vaporizer comprises a plurality of elongate water flow guides arranged side by side about a central axis to define a generally cylindrical structure terminating at its lower margin in a water collection trough, said water guides being spaced apart whereby the flow of air between adjacent guides is permitted, a central fountain disposed to deliver water to the upper ends of said flow guides, and means for shielding said fountain from the force of air delivered to said water-air contacting means by said blower; and in which said means for continuously flowing water to said vaporizer comprises a first container and means for conducting water from said first container to said fountain, a second container and means for conducting water collected in the trough of said vaporizer to said second container, said second container comprising a sloping bottom portion, and a passageway connecting a point in said sloping bottom removed from the lowest point thereof to said first container, and means for replenishing the supply of water in said first container from said second container while precluding transfer to said first container of material floating on the surface of the body of water in said second container, and means for maintaining said second container under pressure.

References Cited

UNITED STATES PATENTS

| | | | |
|---|---|---|---|
| 985,963 | 3/1911 | Zellweger | 55—227 |
| 1,055,845 | 3/1913 | Whitcomb | 60—30 |
| 1,070,956 | 8/1913 | Hall. | |
| 1,117,309 | 11/1914 | Bentz | 55—228 X |
| 1,894,744 | 1/1933 | Hawley | 55—228 X |
| 1,938,849 | 12/1933 | Maxim et al. | 60—30 |
| 2,583,390 | 1/1952 | Paasche | 55—241 X |
| 3,214,902 | 11/1965 | Maring | 60—30 |
| 3,282,047 | 11/1966 | Wertheimer | 60—30 |
| 3,336,733 | 8/1967 | Wisting | 55—228 |
| 3,387,432 | 6/1968 | Ferrara | 55—228 |

FOREIGN PATENTS

| | | |
|---|---|---|
| 637,272 | 1/1928 | France. |
| 317,955 | 1/1920 | Germany. |
| 277,281 | 12/1927 | Great Britain. |

TIM R. MILES, Primary Examiner

U.S. Cl. X.R.

55—228, 229, 241; 60—30; 261—7, 106, 112